(12) United States Patent
Ye

(10) Patent No.: US 10,615,954 B2
(45) Date of Patent: Apr. 7, 2020

(54) LOW-POWER ASYNCHRONOUS DATA LINKS

(71) Applicant: MaxLinear, Inc., Carlsbad, CA (US)

(72) Inventor: Sheng Ye, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 15/078,601

(22) Filed: Mar. 23, 2016

(65) Prior Publication Data

US 2016/0285620 A1 Sep. 29, 2016

Related U.S. Application Data

(60) Provisional application No. 62/137,761, filed on Mar. 24, 2015.

(51) Int. Cl.
*H04L 7/04* (2006.01)
*H04L 7/00* (2006.01)
*H04L 7/06* (2006.01)

(52) U.S. Cl.
CPC ............. *H04L 7/0079* (2013.01); *H04L 7/06* (2013.01); *H04L 7/0087* (2013.01)

(58) Field of Classification Search
CPC ......... H04L 7/027; H04L 1/00; H04L 7/0079; H04L 2012/5674; H04L 27/22; H04L 27/3455; H03L 7/091; H03L 2207/00; G11B 5/59616
See application file for complete search history.

(56) References Cited

U.S. PATENT DOCUMENTS

| 5,550,864 | A | * | 8/1996 | Toy | H04L 25/4904 341/70 |
| 5,579,348 | A | * | 11/1996 | Walker | H03L 7/06 375/355 |
| 9,091,711 | B1 | * | 7/2015 | Wang | G01R 23/02 |
| 9,397,868 | B1 | * | 7/2016 | Hossain | H04L 25/03057 |
| 2007/0146011 | A1 | * | 6/2007 | O'Mahony | G06F 1/04 326/93 |
| 2008/0246752 | A1 | * | 10/2008 | Lee | G09G 3/20 345/213 |

(Continued)

*Primary Examiner* — Aristocratis Fotakis
(74) *Attorney, Agent, or Firm* — Maschoff Brennan; Jason W. Croft

(57) ABSTRACT

Systems and methods are provided for low-power asynchronous data links. A receiver may obtain from signals, received from a transmitter over low-power asynchronous links, recovery information embedded into the signals at the transmitter, and may determine based on the recovery information, control parameters that may be used in configuring a control signal applied during processing of the signals. The signals may be processed based on the control signal, with the processing comprising extraction of data embedded in the signals at the transmitter. The transmitter may generate, based on an input datastream, signals configured for transmission to the receiver, over low-power asynchronous data links, and may embed into the signals, the recovery information that enables determining, at the receiver, parameters relating to the signals and/or to the generating of the signals. The control parameters may comprise parameters relating to the signals and/or processing of the signals at the transmitter.

20 Claims, 7 Drawing Sheets

(56) References Cited

U.S. PATENT DOCUMENTS

| | | | |
|---|---|---|---|
| 2009/0323566 A1* | 12/2009 | Lin | H04L 5/1469 |
| | | | 370/286 |
| 2011/0037758 A1* | 2/2011 | Lim | H03L 7/0805 |
| | | | 345/213 |
| 2015/0033060 A1* | 1/2015 | Kim | G06F 1/12 |
| | | | 713/400 |
| 2015/0346887 A1* | 12/2015 | Cho | G06F 3/0412 |
| | | | 345/174 |

* cited by examiner

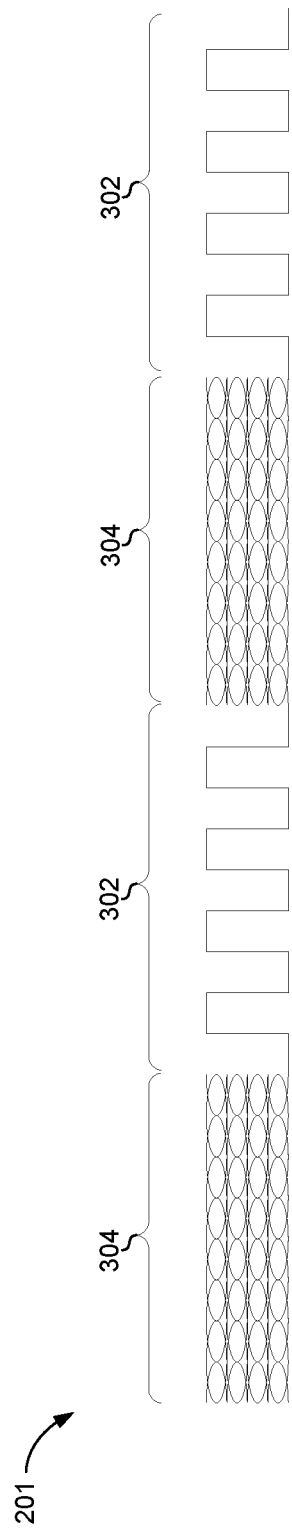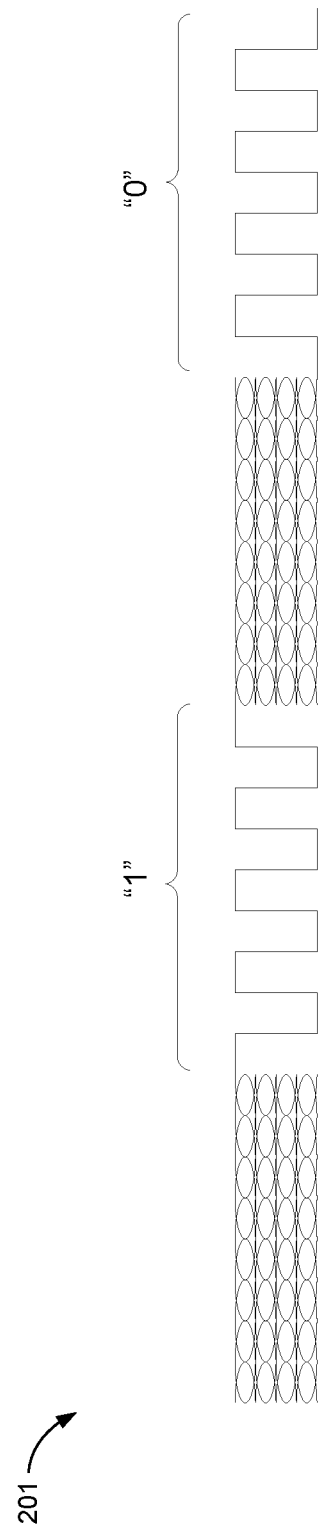

LOW-POWER ASYNCHRONOUS DATA LINKS

CLAIM OF PRIORITY

This patent application makes reference to, claims priority to and claims benefit from U.S. Provisional Patent Application Ser. No. 62/137,761, filed Mar. 24, 2015. The above identified application is hereby incorporated herein by reference in its entirety.

TECHNICAL FIELD

Aspects of the present disclosure relate to communication solutions. More specifically, certain implementations of the present disclosure relate to methods and systems for low-power asynchronous data links.

BACKGROUND

Various issues may exist with conventional approaches for handling communication links. In this regard, conventional systems and methods, if any existed, for utilizing data links, can be costly, inefficient, and/or ineffective. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for low-power asynchronous data links, substantially as shown in and/or described in connection with at least one of the figures, as set forth more completely in the claims.

These and other advantages, aspects and novel features of the present disclosure, as well as details of illustrated embodiments thereof, will be more fully understood from the following description and drawings.

BRIEF DESCRIPTION OF SEVERAL VIEWS OF THE DRAWINGS

FIGS. 3A and 3B depict signals communicated over an asynchronous link in accordance with an example implementation of this disclosure.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
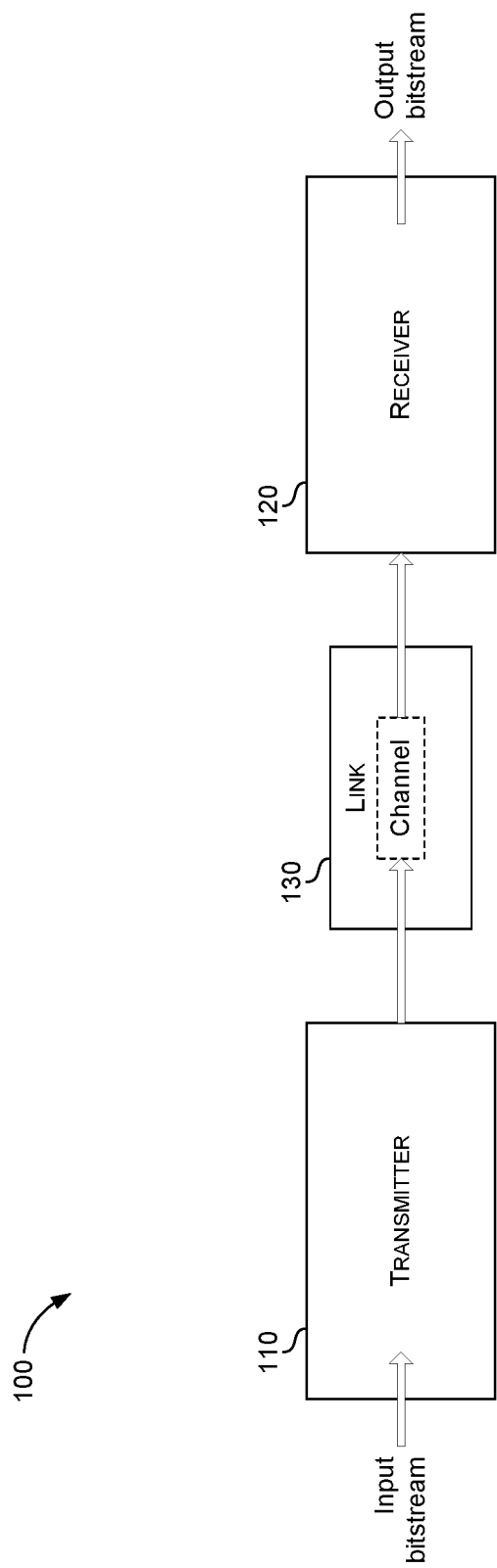
FIG. 1 depicts an example communication setup that supports low-power asynchronous data links, in accordance with this disclosure.

FIG. 1 depicts an example communication setup that supports low-power asynchronous data links, in accordance with this disclosure. Shown in FIG. 1 is communication setup 100, which comprises a transmitter 110, a receiver 120, and a link 130 between the transmitter 110 and the receiver 120.

Each of the transmitter 110 and the receiver 120 may comprise suitable circuitry for enabling and/or handling communications over wired and/or wireless connections. In this regard, each of the transmitter 110 and the receiver 120 may support a plurality of wired and/or wireless interfaces and/or protocols, and may be operable to perform necessary processing operations to facilitate transmission and/or reception of signals (e.g., radio frequency (RF) signals) over supported wired and/or wireless interfaces.

In some instances, the transmitter 110 and the receiver 120 may correspond to (or be components of) two separate electronic devices. In other instances, however, the transmitter 110 and the receiver 120 may be components within the same electronic device, configured to communicate with one another via particular interface. Examples of electronic devices may comprise handheld devices (e.g., cellular (including smart) phones, tablets, etc.), laptops or notebook computers, desktop personal computers, servers, personal media players, set top boxes, satellite receivers, wireless access points, cellular base stations, etc. The disclosure is not limited, however, to any particular type of communication setup (or system), and the various example implementations described in this disclosure may apply to any electronic platform configured for communication (transmission and/or reception) of signals.

Examples of wireless standards, protocols, and/or interfaces which may be supported and/or used by the communication systems $110_1$ and $110_2$ for communication therebetween may comprise wireless personal area network (WPAN) protocols (e.g., as Bluetooth (IEEE 802.15) and ZigBee), near field communication (NFC) standards, wireless local area network (WLAN) protocols (e.g., such as WiFi (IEEE 802.11) standards), cellular standards (including 2G/2G+, such as GSM/GPRS/EDGE, IS-95 or cdmaOne, etc., and 3G/3G+, such as CDMA2000, UMTS, and HSPA, etc.), 4G standards (e.g., WiMAX (IEEE 802.16) and LTE), Ultra-Wideband (UWB), Extremely High Frequency (EHF, such as 60 GHz) Digital TV Standards (e.g., DVB-T/DVB-H, and ISDB-T), etc.

Examples of wireless standards, protocols, and/or interfaces which may be supported and/or used by the communication systems $110_1$ and $110_2$ for communication therebetween may comprise Ethernet (IEEE 802.3), Digital Subscriber Line (DSL), Integrated Services Digital Network (ISDN), Fiber Distributed Data Interface (FDDI), cable television and/or internet access standards (e.g., ATSC, DVB-C, DOCSIS, etc.), in-home distribution standards such as Multimedia over Coax Alliance (MoCA), Universal Serial Bus (USB) based standards/protocols/interfaces, etc.

In operation, the transmitter 110 and the receiver 120 may communicate with each other, such as via one or more connections and/or links (e.g., connection/link 130). Communications between the transmitter 110 and the receiver 120, such as over the connection/link 130, may comprise transmission and reception of signals, which may be utilized to carry data communicated between the transmitter 110 and the receiver 120. The signals, and communication and/or processing thereof, may be configured in accordance with corresponding wired and/or wireless interfaces, protocols, and/or standards. In this regard, the transmitter 110 and the receiver 120 may comprise suitable components configured to perform various functions or operations to facilitate the transmission and reception of signals, particularly signals.

For example, at the transmitter 110, digital data (input bitstream), intended to be carried and/or embedded in communicated signals, may be processed to facilitate transmitting such signals. For example, the transmitter 110 may be operable to perform such functions as modulation, digital-to-analog conversion, mixing, power amplification, etc. A front end (not shown), may then generate and transmit signals configured for communication over the connection/link 130, such as over particular channel(s) within the connection/link 130.

At the receiver 120, signals communicated over the connection/link 130 (or particularly channel(s) in the connection/link 130 used at the transmitter 110) may be received, such as via a front-end (not shown), and may be processed, such as to extract data carried and/or embedded therein (e.g., the digital data/input bitstream embedded into the signals at the transmitter 110). For example, the receiver 120 may be operable to perform such functions as low-noise amplification, mixing, digital-to-analog conversion, demodulation, etc.

In various implementations in accordance with the present disclosure, communication setups/systems (or components thereof), such as the communication setup 100, may be configured for supporting and/or utilizing low-power asynchronous data links. For example, transmitted signals may be configured such that may enable synchronizing receivers (and/or functions performed thereby) to the transmitters (and/or functions thereof), and to do so in optimized manner (e.g., low-power). The signals may be configured, for example, such that may comprise particular portions carrying information (e.g., timing recovery) allowing receivers' synchronization. The information may then be extracted at the receivers, and used to synchronize the receivers (and/or various components and/or functions thereof) with very low overhead. The manner by which the synchronization-enabling portions are configured (e.g., where they be inserted, what information is used, etc.) may be adaptively determined based on characteristics of the components (receiver, transmitter, etc.) and/or the communications. Examples of such implementations and/or techniques for supporting use of low-power asynchronous data links are described in more details below.

Figure 2:
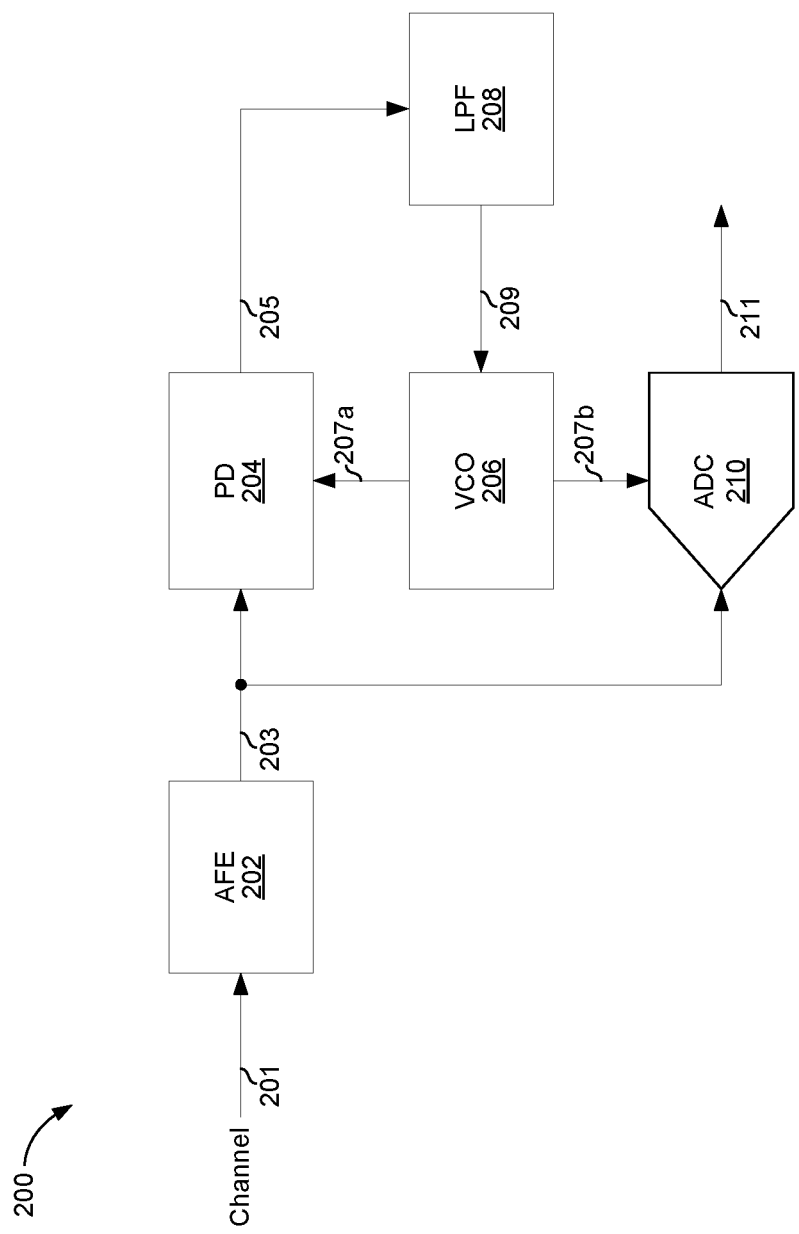
FIG. 2 depicts components of a receiver in accordance with an example implementation of this disclosure.

FIG. 2 depicts components of a receiver in accordance with an example implementation of this disclosure. Shown in FIG. 2 is a receiver 200.

The receiver 200 may comprise suitable circuitry for implementing various aspects of the present disclosure. In particular, the receiver 200 may comprise suitable circuitry for handling reception of signals, particularly in conjunction with use of low-power asynchronous data links. The receiver 200 may correspond to the receiver 120 of FIG. 1.

As shown in the example implementation depicted in FIG. 2, the receiver 200 (or portion thereof depicted in FIG. 2) comprises an analog front end (AFE) circuit 202, a phase detector (PD) circuit 204, a voltage controlled oscillator (VCO) circuit 206, a low pass filter (LPF) circuit 208, and an analog-to-digital converter (ADC) circuit 210.

In operation, the transmitter 200 may be configured for handling signals (signal 201) configured for communication asynchronous data link, and for utilizing information obtained from such signals in support of such communications (e.g., to enable synchronizing the receiver 200, and/or components or functions thereof). For example, the signal 201 is received over a wired, wireless, or optical channel by AFE circuit 202. The AFE circuit 202 may, for example, amplify and filter the signal. Signal 203 output by the AFE circuit 202 is then conveyed to the PD circuit 204 and the ADC circuit 210. The PD circuit 204 generates signal 205. In this regard, the signal 205 indicates the difference in phase between the signal 203 and a reference signal—e.g., a signal 207a, provided by the VCO circuit 206. For example, the signal 205 may be a voltage indicating that difference. The signal 205 output by PD circuit 204 is conveyed to the LPF circuit 208, which applies low-pass filtering to it, to generate a corresponding output, signal 209. The signal 209 is applied to the VCO circuit 206.

The VCO circuit 206 generates oscillating signal(s), such as the feedback signal 207a, noted above, and a clock signal 207b, the frequency of which is controlled by the signal 209 (or voltage thereof). In this manner, the feedback signal 207a and clock signal 207b generated by the VCO circuit 206 are phase-locked to the phase of the signal 203. In an example implementation, clock signal 207b is at the same frequency as the symbol rate of the signal 201.

FIGS. 3A and 3B depict example signals communicated over an asynchronous data link in accordance with an example implementation of this disclosure. Shown in FIGS. 3A and 3B is example configuration of a signal (e.g., the signal 201 of FIG. 2) for communication over asynchronous data links.

As shown in each of FIGS. 3A and 3B, the signal 201 of FIG. 2 comprises general data portions 304 and timing recovery portions 302. The timing recovery portions 302 may comprise particular information incorporated at the transmitter-side, when the signals are configured for communication over low-power asynchronous data links to enable handling of the signals at the receiver-side. For example, the timing recovery portions 302 may comprise information for enabling recovery of symbol timing. The timing recovery portions 302 may be interspersed among the general data portions 304. The interspersing of the timing recovery portions 302 may be done as at a relatively low duty cycle, for example. The duty cycle may be, for example, determined based on parameters such as clock drift in the transmitter, clock drift in the receiver, necessary or desired throughput of the data link, etc. In an example implementation, the duty cycle may be 1% or 5% or any value in in the range of 1%-5%, or any other suitable value.

The general data portions 304 may not comprise sufficient transitions from which a receiver could reliably recover the symbol timing of the signal 201. The timing recovery portions 302, however, may be guaranteed (with some determined probability) to have sufficient transitions from which symbol timing of the signal 201 can be recovered (with some determined accuracy).

For example, the signal 201 may use PAM4 encoding and transitions between adjacent PAM4 levels (e.g., transitions between level 1 and level 2, level 2 and level 3, and level 3 and level 4) may not provide reliable timing recovery. Transitions from level 1 to level 4, on the other hand, may provide reliable timing recovery. Accordingly, the timing recovery portions 302 of signal 201 may be configured to have a sufficient number of transitions from PAM level 1 to PAM level 4 to guarantee symbol timing recovery (with some determined probability). In an example implementation where two-level transitions (i.e., transitions from level 1 to level 3, and from level 2 to level 4) provide reliable symbol timing recovery, those transitions may be used in the timing recovery portions 302 as well (e.g., for encoding more data onto the timing recovery portions 302, as described below).

In some example implementations, the timing recovery portions 302 may convey some data. FIG. 3B provides one such example implementation where a timing recovery portion 302 having a first phase corresponds to transmission of a 1 and a timing recovery portion having the inverse phase corresponds to transmission of a 0. Given the very high clock rates which may be used on the link (e.g., 50 GHz) even this 1-bit-per-timing-recovery-portion scheme can provide for significant throughput on the timing recovery portions 302 (e.g., for 1% duty cycle and 50 GHz link, 500 Mbps can be communicated in the timing recovery portions 302).

Nevertheless, more complex encodings of the timing recovery portions 302 may be used to increase the throughput as long as the encoding is such that there remain sufficient transitions of the signal for timing recovery. The data communicated during the timing recovery portions 302 may be, for example, part of the same datastream communicated during the general data portions 304 and/or may be used as an auxiliary channel for communicating control information or the like.

Figure 4:
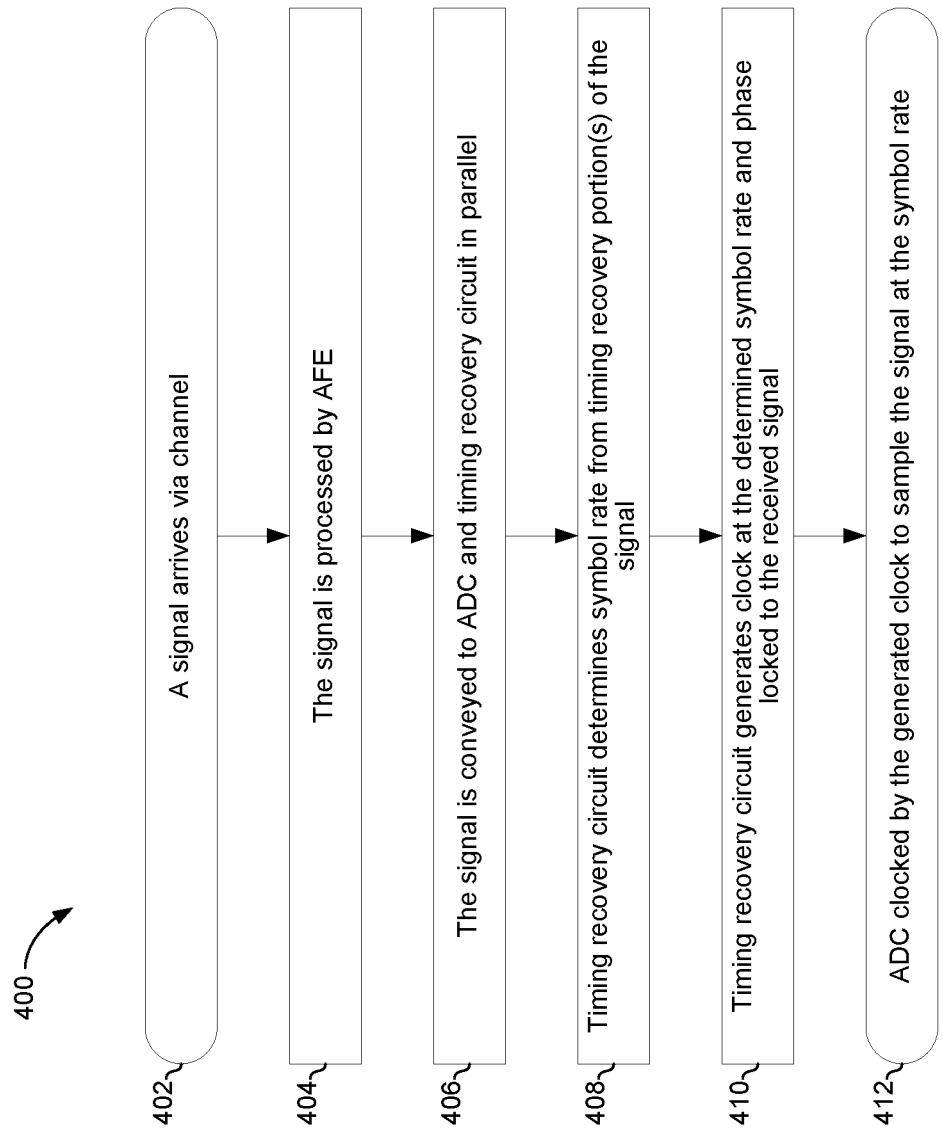
FIG. 4 illustrates a receive process in accordance with an example implementation of this disclosure.

FIG. 4 illustrates a receive process in accordance with an example implementation of this disclosure. Shown in FIG. 4 is flow chart 400, comprising a plurality of example steps (represented as blocks 402-412), which may be performed in a suitable system (e.g., the receiver 200 of FIG. 2) to enabling receiving signals communicated over low-power asynchronous data links, and to recover and use control data (e.g., timing) embedded therein.

In step 402, an input signal (e.g., signal 201) configured for low-power asynchronous data link communication arrives (e.g., at the AFE circuit 202) via a particular channel.

In step 404, the input signal is subject to initial processing (e.g., by the AFE circuit 202) associated with the reception of the signals from the channel, to generate a corresponding output signal (e.g., the signal 203). For example, the input signal is amplified and filtered.

In step 406, the output signal (signal 203) resulting from initial processing is forwarded, in parallel, to processing path for extraction of data carried therein and to a processing path for recovering timing information. For example, the signal 203 is conveyed to the ADC circuit 210 and to a timing recovery loop, comprising, e.g., the PD circuit 204, the LPF circuit 208, and the VCO circuit 206.

In step 408, timing information may be recovered. For example, the timing recovery loop determines the symbol rate of the signal 201 based on the timing recovery portions 302 of the signal 201.

In step 410, timing information may be used in controlling operations of the receiver. For example, the timing recovery loop generates a clock 207b that has a frequency equal to the determined symbol rate and is phase locked to the symbol timing of signal 201.

In step 412, the ADC circuit 210 samples the signal 203 on edges of the clock 207b. Because the clock 207b is phase locked to the symbol timing of signal 203, the ADC circuit 210 reliably samples the signal 203 at the appropriate time (when the "eye" of the signal eye diagram is open) such that oversampling is unnecessary.

Figure 5:
FIG. 5 illustrates a symbol timing recovery process in accordance with an example implementation of this disclosure.

FIG. 5 illustrates a symbol timing recovery process in accordance with an example implementation of this disclosure. Shown in FIG. 5 is flow chart 500, comprising a plurality of example steps (represented as blocks 502-508), which may be performed in a suitable system (e.g., the receiver 200 of FIG. 2) for handling and utilizing recovered timing information.

In step 502, a timing recovery portion 302 of the signal 201 arrives at the timing recovery loop.

In step 504, the timing recovery loop processes the timing recovery portion 302 to lock to the symbol timing of the signal 203.

In step 506, the end of the timing recovery portion 302 is processed. In response to detecting the end of the timing recovery portion 302, adjustment of the clock 207b is paused to prevent the general data portion 304 from introducing noise into the clock 207b. When the next timing recovery portion 302 arrives, the process returns to block 502.

In another example implementation, the timing recovery loop may continue to operate on the general data portions 304. Thus, the timing recovery loop may attempt to track the phase of the general data portion 304. Because there may be insufficient transitions in the general data portion 304, this may introduce some noise in the signal 207b. The timing recovery loop may, however, be configured (e.g., through appropriate selection of the cutoff frequency of LPF circuit 208) and the timing recovery portions 302 may arrive sufficiently often such that this noise it tolerable and does not degrade performance below a determined threshold.

Figure 6:
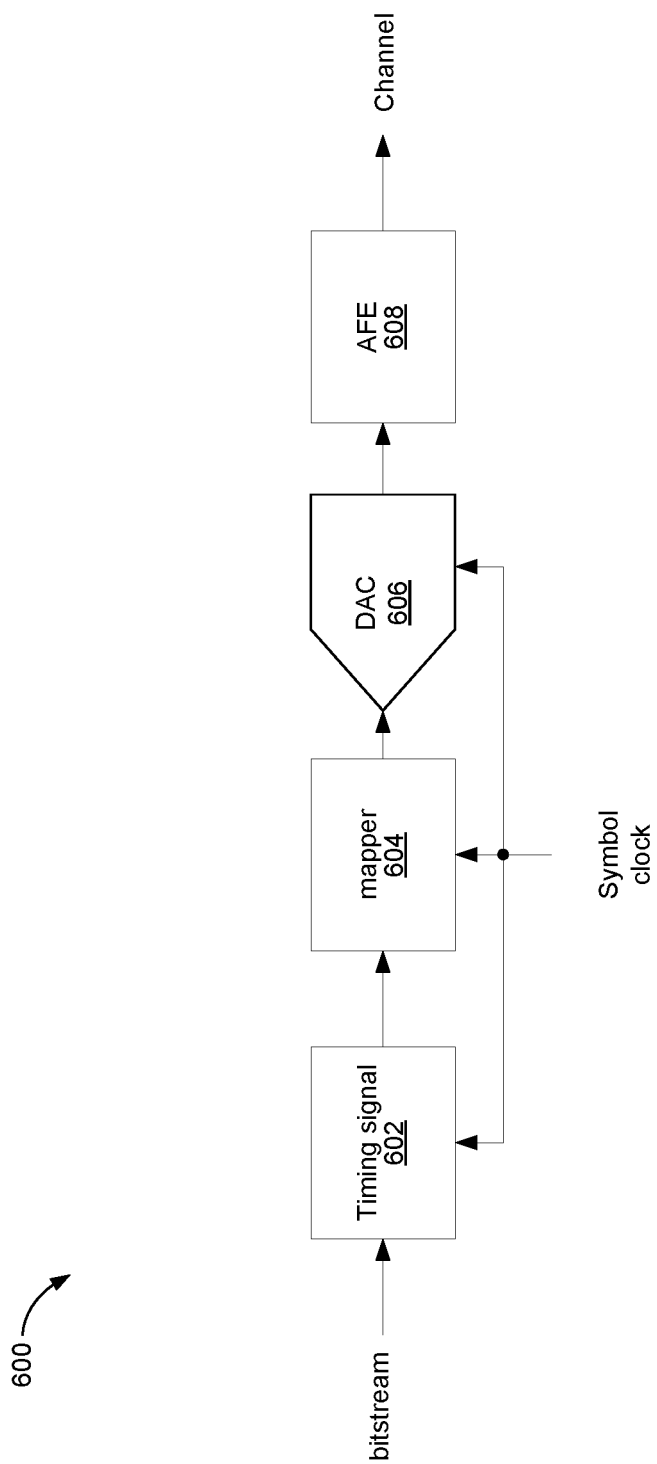
FIG. 6 depicts components of a transmitter in accordance with an example implementation of this disclosure.

FIG. 6 depicts components of a transmitter in accordance with an example implementation of this disclosure. Shown in FIG. 6 is a transmitter 600.

The transmitter 600 may comprise suitable circuitry for implementing various aspects of the present disclosure. In particular, the transmitter 600 may comprise suitable circuitry for handling transmission of signals, particularly in conjunction with use of low-power asynchronous data links. The transmitter 600 may correspond to the transmitter 110 of FIG. 1. As shown in the example implementation depicted in FIG. 6, the transmitter 600 comprises a timing signal control/insertion circuit 602, a mapper circuit 604, a digital-to-analog converter (DAC) circuit 606, and an analog front end (AFE) circuit 608.

In operation, a bitstream to be transmitted arrives at timing signal insertion/control circuit 602. The output of the circuit 602 is mapped by mapper circuit 604 according to the applicable symbol constellation (e.g., PAM4). The output of the mapper circuit 604 is then converted to analog by DAC circuit 606 and processed by AFE circuit 608 (e.g., filtered and amplified) for transmission onto the channel.

In an example implementation, the circuit 602 comprises one or more counters that control the insertion of timing recovery portions 302 at a determined duty cycle. In such an implementation, reaching a first count may trigger a buffering of the bitstream while a timing recovery bit sequence is output to the mapper. For example, the timing recovery bit sequence may comprise e.g., 00110011 which maps to PAM level 1, PAM level 4, PAM level 1, PAM level 4. This resulting signal may provide for reliable symbol timing recovery at the receiver. Reaching a second count may then trigger a return to just passing the bitstream through to the mapper circuit 604 (i.e., emptying the buffer).

In an example implementation, the circuit 602 comprises a counter that controls the switching of encoding modes at a determined duty cycle. In such an implementation, reaching a first counter may trigger a switch from a mode in which the circuit 602 performs no encoding (i.e., the bitstream is just passed through to mapper circuit 604) to a mode in which it encodes one or more bits of the bitstream in accordance with an encoding used for timing recovery portions 302. For example, in the second mode each 1 of the bitstream may be encoded to a timing recovery portion 302 having a first phase and each 0 of the bitstream may be encoded to a timing recovery portion 302 having a second phase, as described above with reference to FIG. 3B. Reaching a second count may then trigger a return to the first mode in which the bitstream is simply passed through the timing signal 602.

Figure 7:
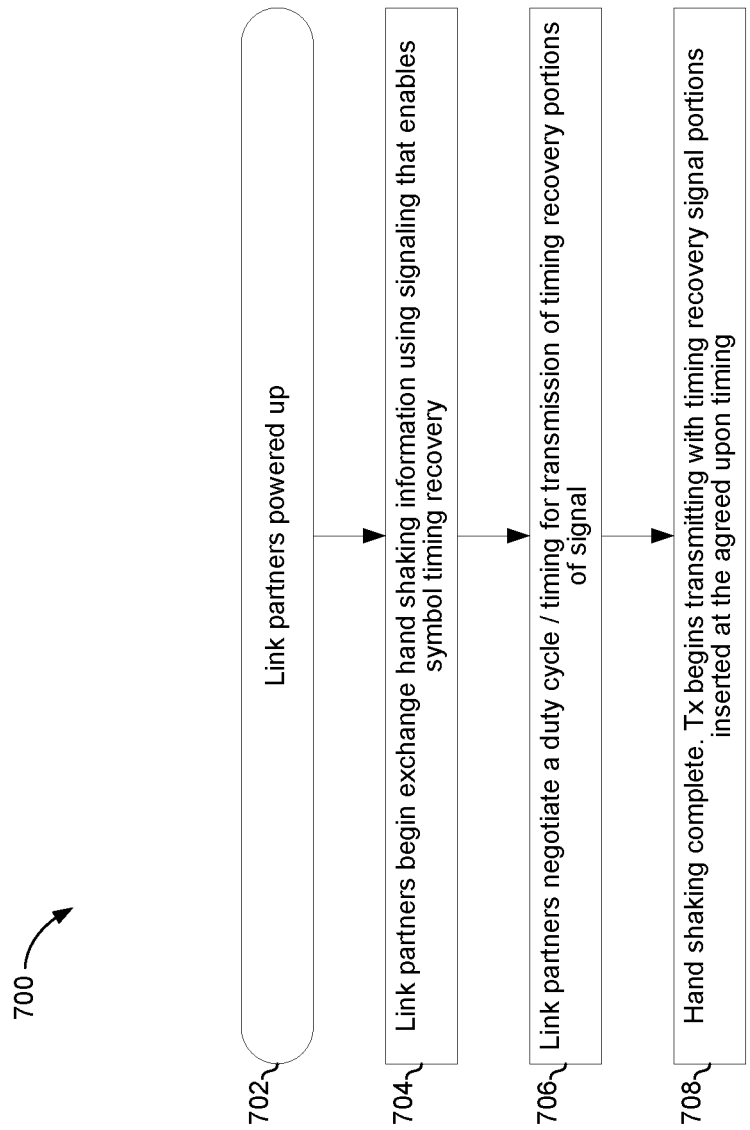
FIG. 7 illustrates a link establishment process in accordance with an example implementation of this disclosure.

FIG. 7 illustrates a link establishment process in accordance with an example implementation of this disclosure. Shown in FIG. 7 is flow chart 700, comprising a plurality of example steps (represented as blocks 702-708), which may be performed in a suitable system (e.g., a system comprising the receiver 200 of FIG. 2 and the transmitter 600 of FIG. 6) for enabling generating and/or configuring signals for communicating over low-power asynchronous data links.

In step 702, link partners, such as the transmitter 600 and receiver 200, are powered up.

In step 704, the link partners begin exchanging handshaking information using signaling that enables symbol timing recovery (e.g., using only PAM levels 2 and 5, which is effectively return-to-zero signaling).

In step 706, the link partners negotiate a duty cycle for transmission of timing recovery portions 302. This negotiation may be, for example, based on their respective clock drifts, data throughput requirements, etc.

In step 708, the handshaking is complete and the transmitter 600 begins transmitting general data portions 304 and timing recovery portions 302 at the agreed upon duty cycle.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A system, comprising:
a receiver that comprises:
one or more timing recovery circuits operable to:
negotiate with a transmitter an embedding of recovery information into signals transmitted by the transmitter, to enable handling of the signals at the receiver;
determine, based on the negotiating, a duty cycle for controlling timing of the embedding and corresponding recovering of the recovery information;
obtain from the signals received from the transmitter, based on the duty cycle, the recovery information embedded into the signals at the transmitter;
determine based on the recovery information, control parameters, wherein the control parameters comprise parameters relating to embedding of data into the signals at the transmitter; and
configure based on the control parameters, a control signal applied during processing of the signals; and
one or more processing circuits operable to process the signals, based on the control signal, wherein the processing comprises extraction of data embedded in the signals at the transmitter.

2. The system of claim 1, wherein the control parameters comprise symbol rate and/or timing applied during the embedding of data into the signals at the transmitter.

3. The system of claim 1, wherein the control signal comprises a clock signal.

4. The system of claim 3, wherein:
the one or more processing circuits comprise an analog-to-digital converter (ADC) circuit; and
the ADC circuit is operable to sample the signals based on the clock signal.

5. The system of claim 3, wherein the one or more timing recovery circuits are operable to, when configuring the clock signal, set one or more parameters of the clock signal based on the control parameters.

6. The system of claim 4, wherein the one or more parameters of the clock comprise frequency, and the frequency is set based on symbol rate determined from the recovery information.

7. The system of claim 4, wherein the one or more parameters of the clock comprise phase, and the phase is set based on symbol timing determined from the recovery information.

8. A system comprising:
a transmitter that comprises:
  one or more processing circuits operable to generate, based on an input datastream, signals configured for transmission to a receiver; and
  one or more timing control circuits operable to:
    negotiate with the receiver an embedding of recovery information into the signals to enable handling of the signals at the receiver;
    determine, based on the negotiating, a duty cycle for controlling timing of the embedding and corresponding recovering of the recovery information; and
    embed into the signals, based on the duty cycle, the recovery information that enables handling of the signals at the receiver, wherein the recovery information comprises parameters relating to embedding of data into the signals.

9. The system of claim 8, wherein the one or more timing control circuits are operable to insert the recovery information into data encoded into the signals during the generating of the signals.

10. The system of claim 8, wherein the one or more timing control circuits are operable to insert the recovery information at particular intervals.

11. The system of claim 10, wherein the one or more timing control circuits are operable to negotiate timing of insertion of the recovery information with the receiver.

12. The system of claim 10, wherein the timing of insertion is negotiated based on one or more of clock drift at receiver, clock drift at transmitter, and data throughput requirements.

13. A method comprising:
in a receiver:
  negotiate with a transmitter an embedding of recovery information into signals transmitted by the transmitter, to enable handling of the signals at the receiver;
  determine, based on the negotiating, a duty cycle for controlling timing of the embedding and corresponding recovering of the recovery information;
  receiving the signals, from a transmitter;
  obtaining from the signals, based on the negotiated duty cycle, the recovery information embedded into the signals at the transmitter;
  determining based on the recovery information, control parameters, wherein the control parameters comprise parameters relating to embedding of data into the signals at the transmitter;
  configuring based on the control parameters, a control signal applied during processing of the signals; and
  processing the signals, based on the control signal, wherein the processing comprises extraction of data embedded in the signals at the transmitter.

14. The method of claim 13, wherein the control parameters comprise symbol rate and/or timing applied during the embedding of data into the signals at the transmitter.

15. The method of claim 13, wherein the control signal comprises a clock signal.

16. The method of claim 15, comprising setting, when configuring the clock signal, one or more parameters of the clock signal based on the control parameters, wherein the one or more parameters of the clock signal comprise frequency and phase.

17. The method of claim 16, comprising setting the frequency based on symbol rate, applied at the transmitter, as determined from the recovery information.

18. The method of claim 16, comprising setting the phase based on symbol timing, applied at the transmitter, as determined from the recovery information.

19. The method of claim 18, comprising inserting the recovery information, by the transmitter, at particular intervals.

20. The method of claim 18, comprising negotiating timing of insertion of the recovery information between the transmitter and the receiver.

* * * * *